(12) United States Patent
Clemm et al.

(10) Patent No.: US 9,311,079 B2
(45) Date of Patent: *Apr. 12, 2016

(54) PARALLEL DEVELOPMENT OF A SOFTWARE SYSTEM

(71) Applicant: International Business Machines Corporation, Armonk, NY (US)

(72) Inventors: Geoffrey M. Clemm, Concord, MA (US); Paul Komar, Lexington, MA (US); Maneesh Mehra, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,898

(22) Filed: Apr. 22, 2014

(65) Prior Publication Data

US 2014/0229914 A1 Aug. 14, 2014

Related U.S. Application Data

(63) Continuation of application No. 13/287,267, filed on Nov. 2, 2011, now Pat. No. 8,756,566.

(51) Int. Cl.
*G06F 9/44* (2006.01)

(52) U.S. Cl.
CPC ... *G06F 8/71* (2013.01); *G06F 8/72* (2013.01)

(58) Field of Classification Search
CPC ..................................... G06F 8/71; G06F 8/72
USPC .................................................. 717/120–123
See application file for complete search history.

(56) References Cited

U.S. PATENT DOCUMENTS

| | | | |
|---|---|---|---|
| 5,161,216 A | 11/1992 | Reps et al. | |
| 6,301,700 B1 | 10/2001 | Choi et al. | |
| 6,658,645 B1 * | 12/2003 | Akuta et al. | 717/106 |
| 6,681,382 B1 | 1/2004 | Kakumani et al. | |
| 7,231,627 B2 | 6/2007 | Fong et al. | |
| 7,290,251 B2 | 10/2007 | Livshits | |
| 7,624,385 B2 | 11/2009 | Waddington et al. | |

(Continued)

FOREIGN PATENT DOCUMENTS

| | | |
|---|---|---|
| WO | 9933006 A1 | 7/1999 |
| WO | 2013064398 A1 | 5/2013 |

OTHER PUBLICATIONS

U.S. Appl. No. 13/447,633, Notice of Allowance, May 12, 2014, 16 pg.

(Continued)

*Primary Examiner* — Qing Chen
(74) *Attorney, Agent, or Firm* — Cuenot, Forsythe & Kim, LLC

(57) ABSTRACT

Software configuration management includes removing a selected section from a first artifact in a first stream. The first artifact includes a plurality of sections, and a second artifact in the first stream is created including the selected section. The second artifact does not include at least one other section of the plurality of sections. An annotation is generated using a processor that specifies the first artifact, a range within the first artifact corresponding to the selected section, and the second artifact into which the selected section is moved. The annotation is used to apply changes implemented in selected artifacts from one stream to another.

10 Claims, 11 Drawing Sheets

(56) References Cited

U.S. PATENT DOCUMENTS

| | | | |
|---|---|---|---|
| 7,712,079 | B2 | 5/2010 | Nakaike et al. |
| 7,908,601 | B2 | 3/2011 | Clemm et al. |
| 8,365,140 | B2 | 1/2013 | Heyhoe et al. |
| 8,495,567 | B2 | 7/2013 | Bak et al. |
| 8,756,566 | B2 | 6/2014 | Clemm et al. |
| 8,839,196 | B2 | 9/2014 | Clemm et al. |
| 2004/0226006 | A1 | 11/2004 | Russel |
| 2004/0230886 | A1 | 11/2004 | Livshits |
| 2005/0044530 | A1* | 2/2005 | Novik ............... 717/122 |
| 2005/0086631 | A1 | 4/2005 | Nakaike et al. |
| 2005/0262485 | A1 | 11/2005 | Plante |
| 2006/0050984 | A1 | 3/2006 | Tilton |
| 2006/0225040 | A1 | 10/2006 | Waddington |
| 2006/0225052 | A1 | 10/2006 | Waddington et al. |
| 2006/0259884 | A1 | 11/2006 | Fong et al. |
| 2008/0104581 | A1 | 5/2008 | Clemm et al. |
| 2009/0210852 | A1 | 8/2009 | Martineau |
| 2009/0249291 | A1 | 10/2009 | Bak et al. |
| 2009/0271768 | A1 | 10/2009 | Goodson |
| 2009/0300580 | A1 | 12/2009 | Heyhoe et al. |
| 2010/0077380 | A1 | 3/2010 | Baker et al. |
| 2011/0010687 | A1 | 1/2011 | Plante |
| 2011/0078658 | A1 | 3/2011 | Misch et al. |
| 2013/0111441 | A1 | 5/2013 | Clemm et al. |
| 2013/0111442 | A1 | 5/2013 | Clemm et al. |
| 2014/0229913 | A1 | 8/2014 | Clemm et al. |

OTHER PUBLICATIONS

Int'l. Appln. No. PCT/EP2012/071002 [Filed Oct. 24, 2012], International Search Report and Written Opinion, Mar. 12, 2013, 9 pg.
U.S. Appl. No. 13/287,267, Notice of Allowance, Feb. 6, 2014, 16 pg.
Hindle, A., "Software process recovery: recovering process from artifacts," Proc. IEEE 17th Working Conf.on Reverse Engineering (WCRE 2010), pp. 305-208, Oct. 13-16, 2010.
Ecole Polytechnique De Montreal, "Time Monitoring Tool Software Development Plan," [online] pp. 1-12, 2002, retrieved from the Internet: <http://www.upedu.org/templates/cs/PM/upedu_ex_sdp.pdf>.
Dantas, C.R., et al.,"Consistent Evolution of UML Models by Automatic Detection of Change Traces," Proc. of 8th Int'l. Workshop on Principles of Software Evolution (IWPSE'05), 4 pgs., 2005.
Grinter, R.E. "Using a Configuration Management Tool to Coordinate Software Development," In Proc. Conf. on Organizational Computing Systems, pp. 168-177, ACM, 1995.
Perry et al. "Parallel Changes in Large-Scale Software Development: An Observational Case Study," In ACM Transactions on Software Engineering and Methodology (TOSEM), vol. 10, No. 3, pp. 307-337. Jul. 2001.
Torvalds, L., "RE: Merge with git-pasky II, trace moving of content between files," [online] Gmane.org., Apr. 15, 2005 [ retrieved Feb. 28, 2013] retrieved from the Internet: <http://article.gmane.org/gmane.comp.version-control.git/217>, 2 pg.
Dig, D. et al., "Refactoring-Aware Configuration Management for Object-Oriented Programs," In Proc. of 29th Int'l. Conf. on Software Engineering, ICSE '07, IEEE Computer Society, May 1, 2007, pp. 427-436.
List of IBM Patents or Patent Applications Treated as Related, 3 pgs, Apr. 22, 2014.

* cited by examiner

PARALLEL DEVELOPMENT OF A SOFTWARE SYSTEM

CROSS-REFERENCE TO RELATED APPLICATIONS

This application is a Continuation of U.S. application Ser. No. 13/287,267, now U.S. Pat. No. 8,756,566, filed on Nov. 2, 2011, which is incorporated by reference herein in its entirety.

BACKGROUND

One or more embodiments disclosed within this specification relate to parallel development of a software system using a software configuration management (SCM) system.

An SCM system helps to coordinate the actions of many developers while working on a complex software system. During the development process, the SCM system can manage operations such as version control among the various software assets that are generated and/or updated as part of the software system under development. The SCM system further helps to coordinate activities conducted across different versions of the software system. For example, the SCM system can coordinate updates or fixes that must be carried forward from one release to the next inclusive of updates or fixes that must be propagated from an older release to a newer release still under development.

BRIEF SUMMARY

One or more embodiments disclosed within this specification relate to parallel development of a software system using a software configuration management system.

An embodiment can include a method of software configuration management. The method can include removing a selected section from a first artifact in a first stream, wherein the first artifact includes a plurality of sections, and creating a second artifact including the selected section in the first stream. At least one other section of the plurality of sections is not included in the second artifact. An annotation can be generated, using a processor, specifying the first artifact, a range within the first artifact corresponding to the selected section, and the second artifact into which the selected section is moved.

Another embodiment can include a method of software configuration management. The method can include selecting a first artifact in a first stream, including content of the first artifact within a second artifact in the first stream, and generating an annotation indicating that the first artifact no longer exists in the first stream and indicating that the second artifact includes the content of the first artifact using a processor.

Another embodiment can include a method of software configuration management. The method can include selecting an artifact within a first directory tree component within a first stream, creating a copy of the artifact within a second directory tree component within the first stream, and generating an annotation indicating that the copy of the artifact from the first directory tree component is included in the second directory tree component using a processor.

One or more other embodiments can include computer program products for software configuration management. The computer program product(s) can include a computer readable storage medium having computer readable program code embodied therewith. The computer readable program code can be configured to implement or perform the various functions and/or operations disclosed within this specification.

One or more other embodiments can include a system configured for software configuration management. The system can include a processor that is configured to initiate the functions and/or operations described within this specification.

DETAILED DESCRIPTION

Figure 1:
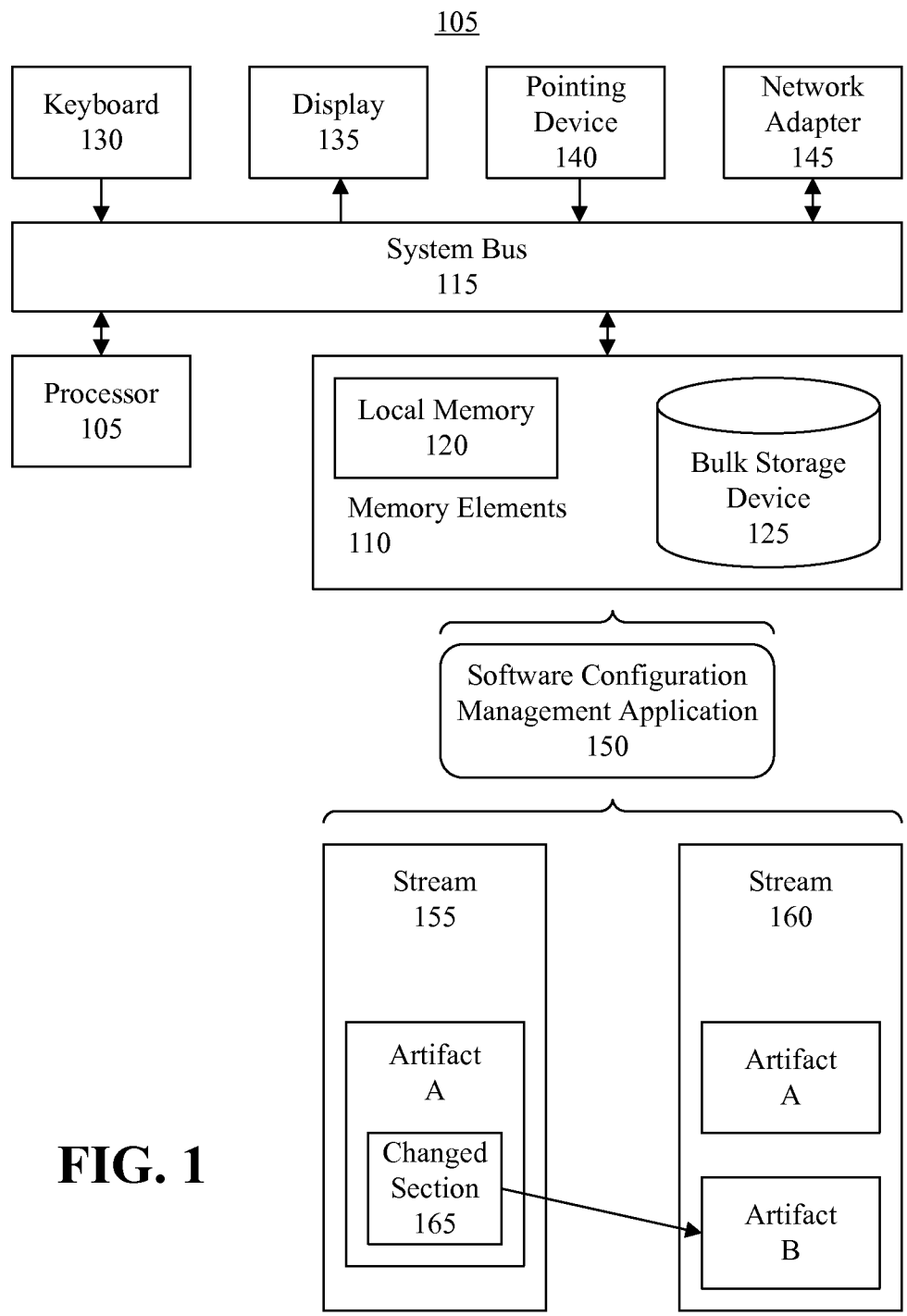
FIG. 1 is a block diagram illustrating a software configuration management (SCM) system in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to parallel development of a software system using a software configuration management (SCM) system. In accordance with one or more embodiments disclosed herein, an SCM system can be configured to perform one or more operations that allow changes to software assets to be implemented across various logical boundaries that exist within the SCM system. In implementing the changes, any history of the related software assets can be carried forward with the change despite the crossing of any boundaries between versions, streams, or other types of logical boundaries that may exist within the SCM system.

For example, content can be split-out of a particular software asset and placed into a new software asset while retaining a traceable path between the software asset from which content is removed and the newly created software asset into which the content is placed. In another example, a software asset can be moved into another software asset leaving a traceable path indicating that the software asset is subsumed within the other software asset. By maintaining the traceable paths, further changes to the software system under development can be implemented across streams, revisions, and the like.

For ease of illustration, the term "element" refers to software objects or software assets that have a unique or a distinct identity within an SCM system. Examples of elements within an SCM system can include a file, also referred to as an "artifact," and a "directory tree component." Each element can be part of a software system being developed or maintained and can be tracked within the SCM system individually. For example, each element within an SCM system can have a unique identifier associated with the element for such tracking purposes. The term "section," as used within this specification, refers to a portion of a tracked element such as an artifact within the SCM system. For example, a section can refer to a portion of content of an artifact, such as text including, but not limited to, human readable source code, or the like. A section, for example, can be an amount of content from an artifact that is less than the entirety of the content of the artifact. As such, a section is not tracked in and of itself within the SCM system. Rather, tracking of a section can be performed by the SCM system through comparison and/or matching functions or analysis of elements.

FIG. 1 is a block diagram illustrating an SCM system 105 in accordance with an embodiment disclosed within this specification. In general, SCM system 105 can be implemented in the form of a data processing system loaded with and/or executing an SCM application 150. As such, SCM system 105 can include at least one processor 105 coupled to memory elements 110 through a system bus 115. SCM system 105 can store program code within memory elements 110.

Processor 105 can execute the program code accessed from memory elements 110 via system bus 115. In one aspect, for example, SCM system 105 can be implemented as a computer that is suitable for storing and/or executing program code, e.g., a server or the like. It should be appreciated, however, that SCM system 105 can be implemented in the form of any system including a processor and memory that is capable of performing the functions described within this specification.

Memory elements 110 can include one or more physical memory devices such as, for example, local memory 120 and one or more bulk storage devices 125. Local memory 120 refers to RAM or other non-persistent memory device(s) generally used during actual execution of the program code. Bulk storage device(s) 125 can be implemented as a hard drive or other persistent data storage device. SCM system 105 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device (not shown) optionally can be coupled to SCM system 105. The I/O devices can be coupled to SCM system 105 either directly or through intervening I/O controllers. A network adapter 145 also can be coupled to SCM system 105 to enable SCM system 105 to become coupled to other systems, computer systems, remote printers, and/or remote storage devices through intervening private or public networks. Modems, cable modems, and Ethernet cards are examples of different types of network adapters 145 that can be used with SCM system 105.

As pictured in FIG. 1, memory elements 110 can store SCM application 150. SCM application 150, being implemented in the form of executable program code, can be executed by SCM system 105 to perform the various functions and/or operations described within this specification. It should be appreciated that SCM system 105 can be configured to output results described herein in any of a variety of different ways. For example, "outputting" and/or "output" can mean storing in memory elements 110, writing to a file stored in memory elements 110, writing to display 135 or other peripheral output device, playing audible notifications, sending or transmitting to another system such as one or more client systems, exporting, or the like. Like numbers will be used to refer to the same items throughout this specification.

SCM application 150, as executed by SCM system 105, can provide and implement functions relating to the organization and tracking of multiple versions of a software system. SCM system 105, for example, facilitates the parallel and/or concurrent development of one or more different versions, streams, and/or builds of a software system.

For example, as pictured in FIG. 1, SCM system 105 can include and mange stream 155 and stream 160 of a particular software system. Each stream, for example, can represent a software product or software environment that is being developed or maintained by one or more developers. For instance, stream 155 can represent a maintenance build of a software system. Stream 160 can represent a development build of the software system. It should be appreciated that SCM system 105 can maintain more than one stream and that the number of streams shown is for purposes of illustration only. For example, further streams can be managed relating to different versions of the software system.

SCM system 105 can organize each of streams 155 and 160 according to an established hierarchy. For example, each of streams 155 and 160 can include one or more artifacts. Stream 155 is shown to include artifact A. Stream 160 is shown to include artifact A and artifact B. Each artifact can include one or more sections. As noted, a section can refer to a portion of content such as text including, but not limited to, human readable program code, e.g., source code. Artifact A of FIG. 1 includes a changed section 165. In general, SCM system 105 can provide various operations that enable the propagation of changed sections from an originating or source stream, e.g., stream 155, to a target stream, e.g., stream 160, despite the target stream including one or more refactored changes therein.

In the example shown, artifact A within stream 155 can include one or more different sections. Within stream 160, however, one or more sections that were previously included in artifact A of stream 155 have been refactored into different artifacts. More particularly, changed section 165 in stream 155 is no longer located in artifact A in stream 160, but rather in artifact B. Thus, in accordance with one or more embodiments disclosed within this specification, changes detected in changed section 165 can be applied to the appropriate artifact, e.g., artifact B in stream 160, and to the appropriate portion or section within artifact B.

The case illustrated in FIG. 1 is provided for purposes of illustration only and, as such, is not intended to limit the one or more embodiments disclosed within this specification. Further operations and examples of operations are described with reference to the remaining figures. For example, SCM system 105 can implement operations including, but not limited to, split-out, combine, and copy types of SCM operations and also perform various other operations that may be required as a consequence of implementing the split-out, combine, and/or copy types of SCM operations.

Figure 2:
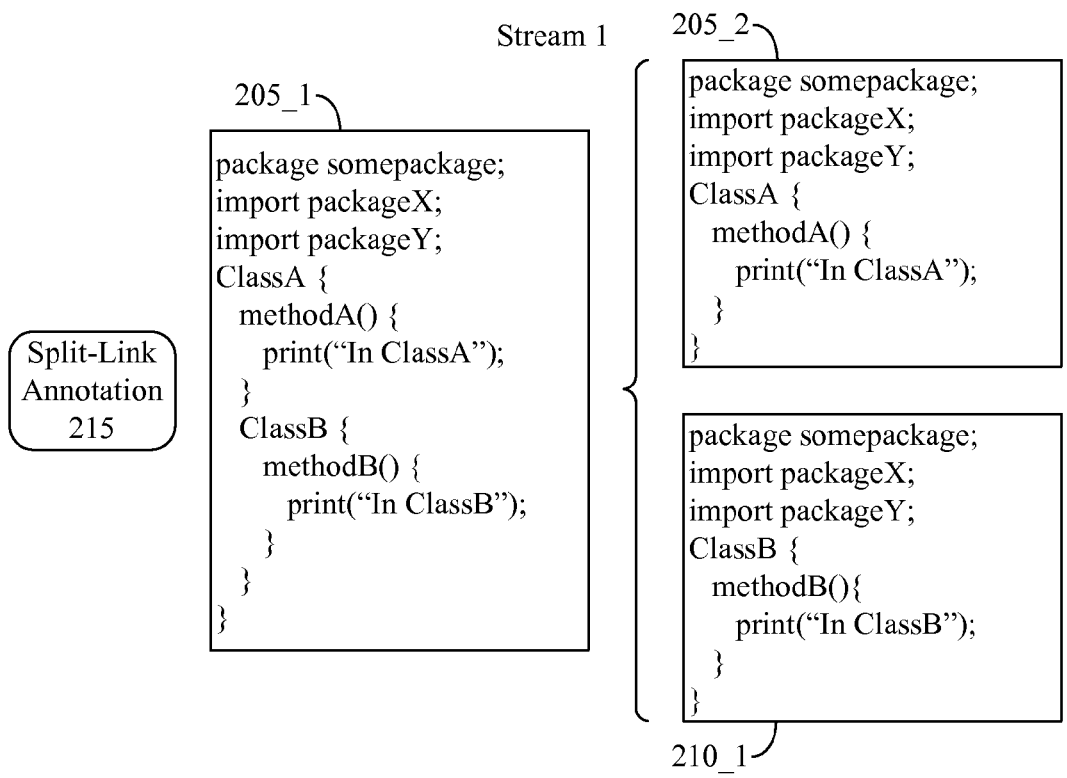
FIG. 2 is a block diagram illustrating an example of a split-out type of SCM operation in accordance with another embodiment disclosed within this specification.

FIG. 2 is a block diagram illustrating an example of a split-out type of SCM operation in accordance with another embodiment disclosed within this specification. The split-out operation can be performed by the SCM system described herein. In general, FIG. 2 illustrates an artifact 205_1 named ClassA.xxx. For purposes of illustration, the examples described throughout this specification utilize object oriented programming language conventions illustrated in source, or human readable, code. Often, object oriented programming language conventions place artifact structure requirements on the program code being developed. One common example is that the outer class of a portion of program code typically is to be contained in an artifact having a name that corresponds to, or is the same as, the class. Thus, ClassA, being the outer class, is included in artifact 205_1, which is named ClassA.xxx.

While developing a software system, it may be required that ClassB, which is included within ClassA, be refactored, or split-out, out of ClassA.xxx and placed into a newly generated artifact, e.g., artifact 210_1 called ClassB.xxx. FIG. 2 illustrates that an SCM system can split-out ClassB from artifact 205_1 and create a new artifact called ClassB.xxx, e.g., artifact 210_1, in which ClassB is placed. After refactoring, a new version of artifact 205 results indicated as artifact 205_2, which can continue to be named ClassA.xxx. As shown, artifact 205_2 no longer includes ClassB.

Within this specification, versions of artifacts generally are indicated by the value following an underscore symbol (_). Thus, artifact 205 can have a first version indicated by 205_1 and a second version indicated by 205_2. In the context of a split-out operation, the split-out operation is performed within a same stream. Thus, prior to the split-out operation, artifact 205_1 exists. After the split-out operation, a new version of artifact 205 is created, which is denoted as artifact 205_2, and a new artifact is created, denoted as artifact 210_1, e.g., a first version of the new artifact. The operations are performed within a same stream.

In general, the section, e.g., content, that is removed from an artifact in performing a split-out operation can be referred to as the "split-out content." In this example, the split-out content is ClassB in that ClassB is removed from artifact 205. Artifact 205_1 can be referred to as the "pre-split element." The pre-split element refers to the artifact and version from which the split-out content is removed. Artifact 210 can be referred to as the "post-split element." The post-split element refers to the artifact and version that is created and into which split-out content is placed while performing the split-out operation.

From time to time within this specification, reference made to a particular artifact, e.g., artifact 205 or artifact 210, without the underscore and following value corresponding to the version. In such cases, reference to the artifact alone refers to the artifact in general without reference to a particular version or without reference a particular stream. The SCM system, for example, can track an "artifact" as an entity along with the various associated versions that may exist. In this regard, for example, an artifact can exist within one or more different streams, with the artifact having one or more different versions in each stream. Using the underscore following the reference number references a particular version of the artifact.

The split-out operation, as performed by the SCM system, further generates metadata associated with, and describing, the split-out operation that is performed. In one aspect, the metadata can be referred to as an annotation. With regard to a split-out type of SCM operation, the metadata that is generated by the SCM system can be referred to as a "split-link annotation" shown as split-link annotation 215. Split-link annotation 215 can include an identifier signifying that the annotation is of the split-link type. Split-link annotation 215 can include, or specify, the pre-split element (e.g., artifact 205_1) by specifying the artifact, version, and stream of the artifact from which the split-out content is taken.

Split-link annotation 215 further can include, or specify, the range of content from the pre-split element that was refactored out and included in the post-split element. More particularly, split-link annotation 215 can include or specify the range, e.g., the bounds, of the split-out content in relation to artifact 205_1. For example, the range can be specified in terms of a starting byte address and line number and an ending byte address and line number of the split-out content as that split-out content (e.g., ClassB) resided in the pre-split element (artifact 205_1). Referring to FIG. 2, the range can specify the byte address of the first character on the line starting ClassB and the line number to the byte address of the first character after the line containing the closing brace for ClassB and the line number.

Split-link annotation 215 also can include, or specify, the post-split element that is created by the split-out operation in terms of the artifact and version, e.g., artifact 210_1. As such, split-link annotation 215 signifies that artifact 210_1 was generated as a result of the SCM system performing a split-link operation using artifact 205_1 as the pre-split element. For example, split-link annotation 215 can specify the name and version of artifact 210_1. The split-out operation is performed within a same stream. As such, artifact 210_1 exists within the same stream as artifact 205_1 and 205_2. It should be appreciated that since split-link annotation 215 specifies artifact 205_1 as the pre-split element, the SCM system can infer or determine that artifact 205_2 is the resulting version of the pre-split element generated in consequence of removing the split-out content. Split-link annotation 215 also can specify event information relating to the split-out operation such as the date and/or time that the split-out operation was performed and the particular user that initiated or requested the split-out operation.

Figure 3:
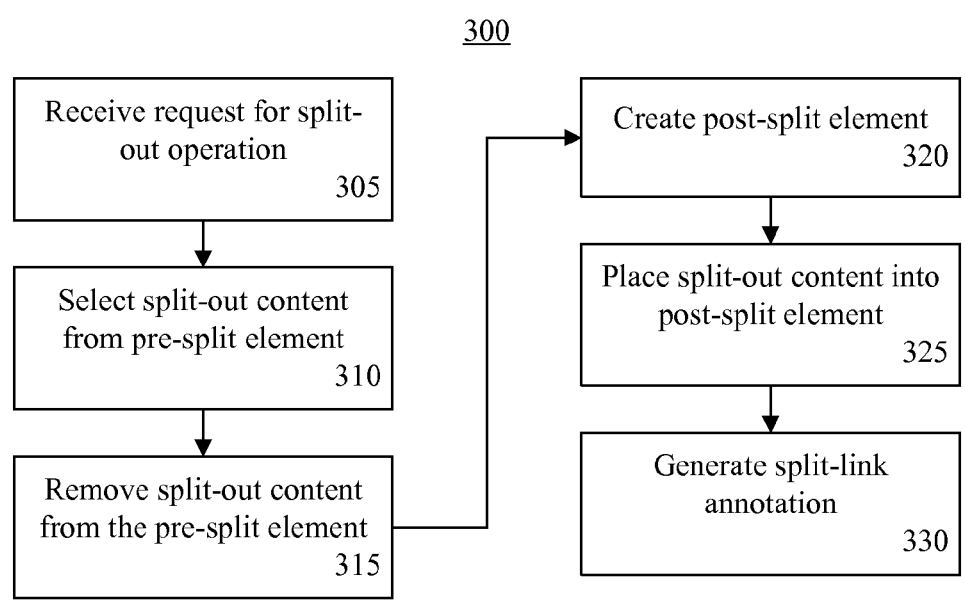
FIG. 3 is a flow chart illustrating a method of performing a split-out type of SCM operation in accordance with another embodiment disclosed within this specification.

FIG. 3 is a flow chart illustrating a method 300 of performing a split-out type of SCM operation in accordance with another embodiment disclosed within this specification. Method 300 can be implemented by the SCM system described herein. In step 305, a request for a split-out operation can be received by the SCM system. The request can specify the pre-split element and the particular content to be split-out from the pre-split element.

In step 310, the SCM system can select the split-out content from within the pre-split element. In step 315, the SCM system can remove the split-out content, e.g., the selected content, from the pre-split element. In step 320, the SCM system can create the post-split element, e.g., a new artifact, within the current stream. As discussed, the newly created post-split element can be named according to any naming conventions required by the particular programming language that is being used. In step 325, the SCM system can include the split-out content within the newly created post-split element. In step 330, the SCM system can generate the split-link annotation. The split-link annotation can be stored within the SCM system and, by virtue of the artifacts and/or versions referenced therein, can be determined to be associated with one or more artifacts and/or particular versions thereof.

Performance of one or more split-out operations can result in one or more streams having components with split-link annotations. When the SCM system is directed to perform a merge of one stream with another, e.g., a source stream with a target stream, the SCM system can identify those elements within the target stream that are associated with split-link annotations and perform merge operations as described within this specification.

Figure 4:
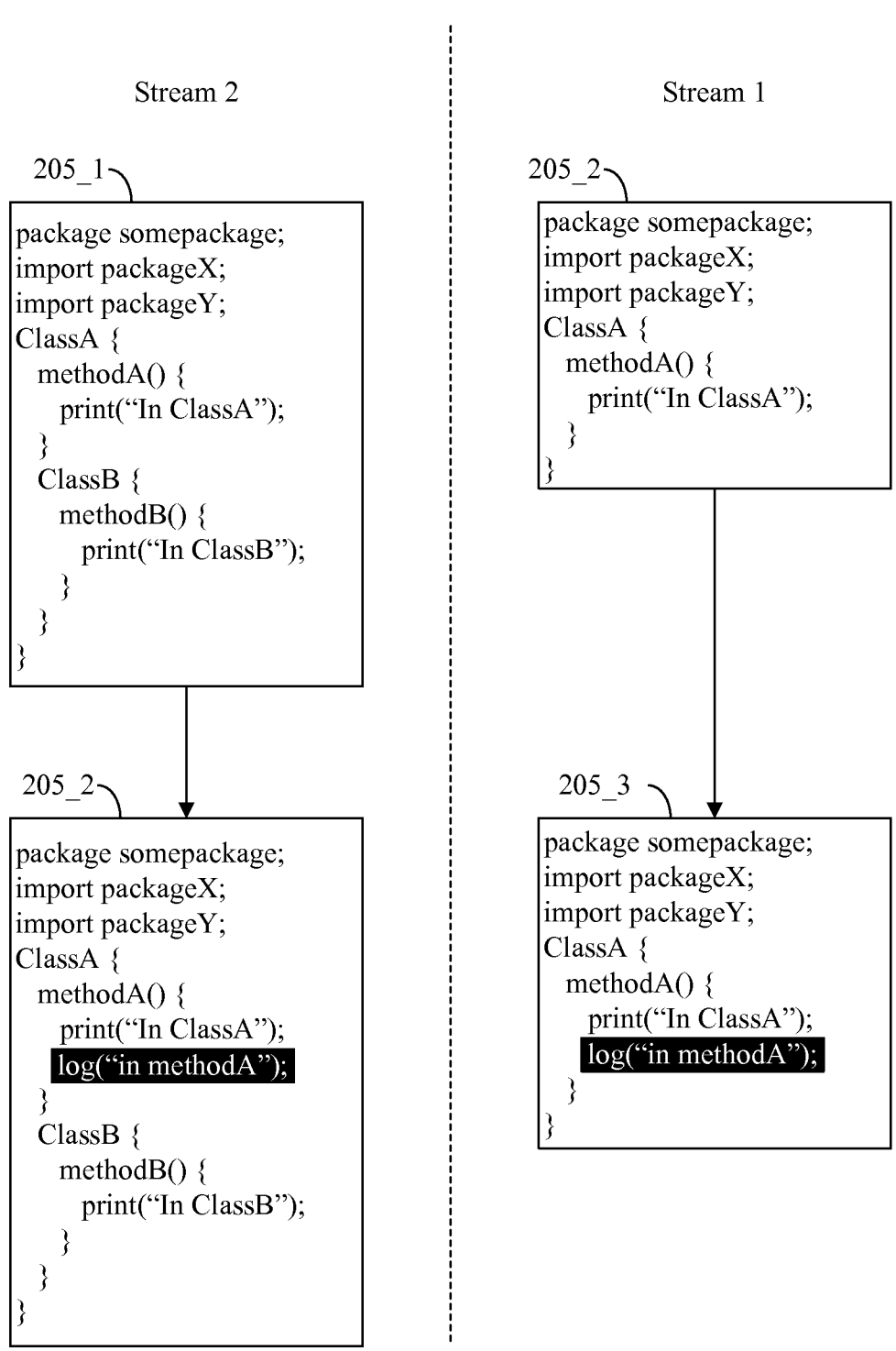
FIG. 4 is a block diagram illustrating an example of an SCM operation in accordance with another embodiment disclosed within this specification.

FIGS. 4-7 illustrate further examples of operations that can be performed by an SCM system as disclosed within this specification system relating to split-out operations. FIG. 4 is a block diagram illustrating an example of an SCM operation in accordance with another embodiment disclosed within this specification. For purposes of illustration, consider the case in which a split-out operation has been performed on artifact 205_1 in stream 1 resulting in the creation of artifact 205_2 as described with reference to FIG. 2. For ease of illustration, indication of the stream of a particular artifact or version thereof will be indicated, from time to time within this specification, by appending "-streamN" to the particular reference number, where "N" refers to the number of the stream in which the artifact or version thereof is located.

Within a different stream, e.g., stream 2, artifact 205 exists in a pre-split out state. More particularly, ClassB is still located within artifact 205_1-stream2. Artifact 205_1-stream2 is modified thereby resulting in the creation of a second version denoted as artifact 205_2-stream2. The change implemented within artifact 205_2-stream2 is illustrated in highlighting and is to be applied to stream 1 in consequence of a merge request received by the SCM system. As noted, ClassB, however, has been split-out from artifact 205 in stream 2 from a previously implemented split-out operation.

In carrying forward the change implemented in artifact 205_2-stream2 to stream 1, the SCM system can determine the change between artifact 205_1-stream2 and artifact 205_2-stream2. The SCM system can determine the change implemented and the location of the change implemented in artifact 205_2-stream2 as it relates to artifact 205_1-stream2.

The SCM system further can search for any split-link annotations associated with artifact 205. Annotations, in general, can be said to relate to particular artifacts. For example, an annotation can refer to one or more artifacts and specific versions of artifacts. In this regard, the SCM system can search for an annotation relating to a particular artifact regardless of version and/or stream. In other cases, the SCM system can search for an annotation relating to a specific artifact version and/or stream. In illustration, an annotation can be located for, or from, any version of an artifact in any stream.

In this example, the SCM system can locate split-link annotation 215, which is associated with artifact 205. As discussed, split-link annotation 215 indicates the pre-split element, e.g., artifact 205_1-stream1. The SCM system then can determine whether the location of the change as implemented in artifact 205_2-stream2 is within the range specified in split-link annotation 215. It should be appreciated that the location of the change in artifact 205_2-stream2 can be correlated with a like or same location within the pre-split element, e.g., artifact 205_1-stream1 (not shown).

In this example, the location of the change falls outside of the range specified in split-link annotation 215. As shown, the change in artifact 205_2-stream2 is within ClassA and, as such, is to be implemented within the most recent version of artifact 205 in stream 1 after performance of the split-out operation, i.e., artifact 205_2-stream1, as opposed to artifact 210. Accordingly, the SCM can perform a merge operation in which the change to artifact 205_2-stream2 is implemented within, or applied to, artifact 205_2-stream1 resulting in a new version of artifact 205 shown as artifact 205_3 in stream 1.

Figure 5:
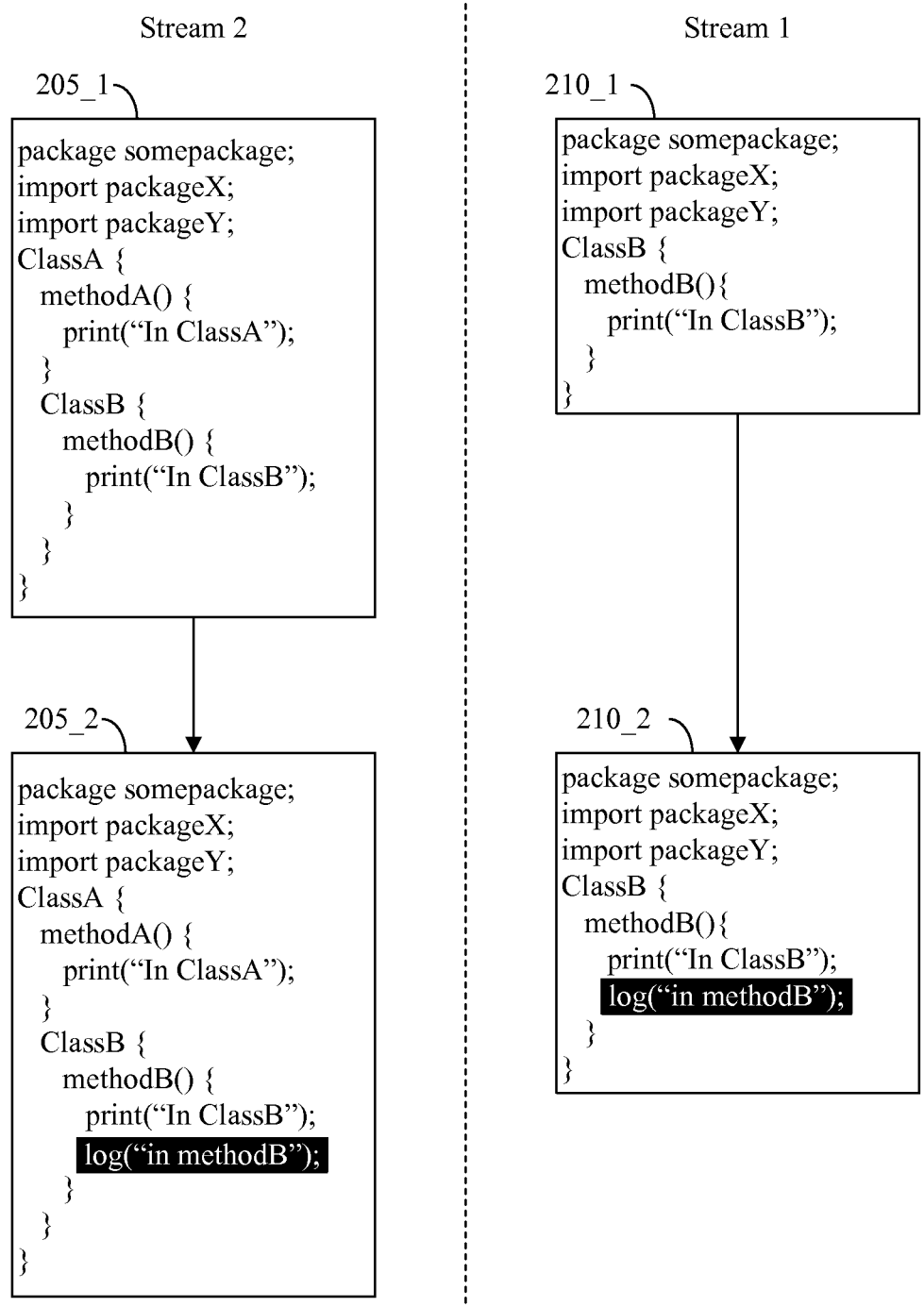
FIG. 5 is a block diagram illustrating an example of an SCM operation in accordance with another embodiment disclosed within this specification.

FIG. 5 is a block diagram illustrating an example of an SCM operation in accordance with another embodiment disclosed within this specification. FIG. 5 illustrates an example in which the change implemented within artifact 205_2-stream2 falls within the bounds of the range specified in split-link annotation 215, e.g., within ClassB. As was the case in FIG. 4, the change implemented within artifact 205_2-stream2 is to be implemented within stream 1.

The SCM system can implement operations similar to those described with reference to FIG. 4. The SCM system can determine that the change implemented in artifact 205_2-stream2 is within the range specified in split-link annotation 215, e.g., within the split-out content from artifact 205_1-stream1. For example, the SCM system can compare the position or location of the change implemented within artifact 205_2-stream2 with the range specified in split-link annotation 215. As shown, the change in artifact 205_2-stream2 is within ClassB and, as such, the SCM system implements the change within artifact 210_1, as determined from split-link annotation 215. The SCM system can perform a merge operation in which the change to artifact 205_2-stream2 is implemented within artifact 210_1-stream1 resulting in a new version of artifact 210 shown as artifact 210_2 in stream 1.

Figure 6:
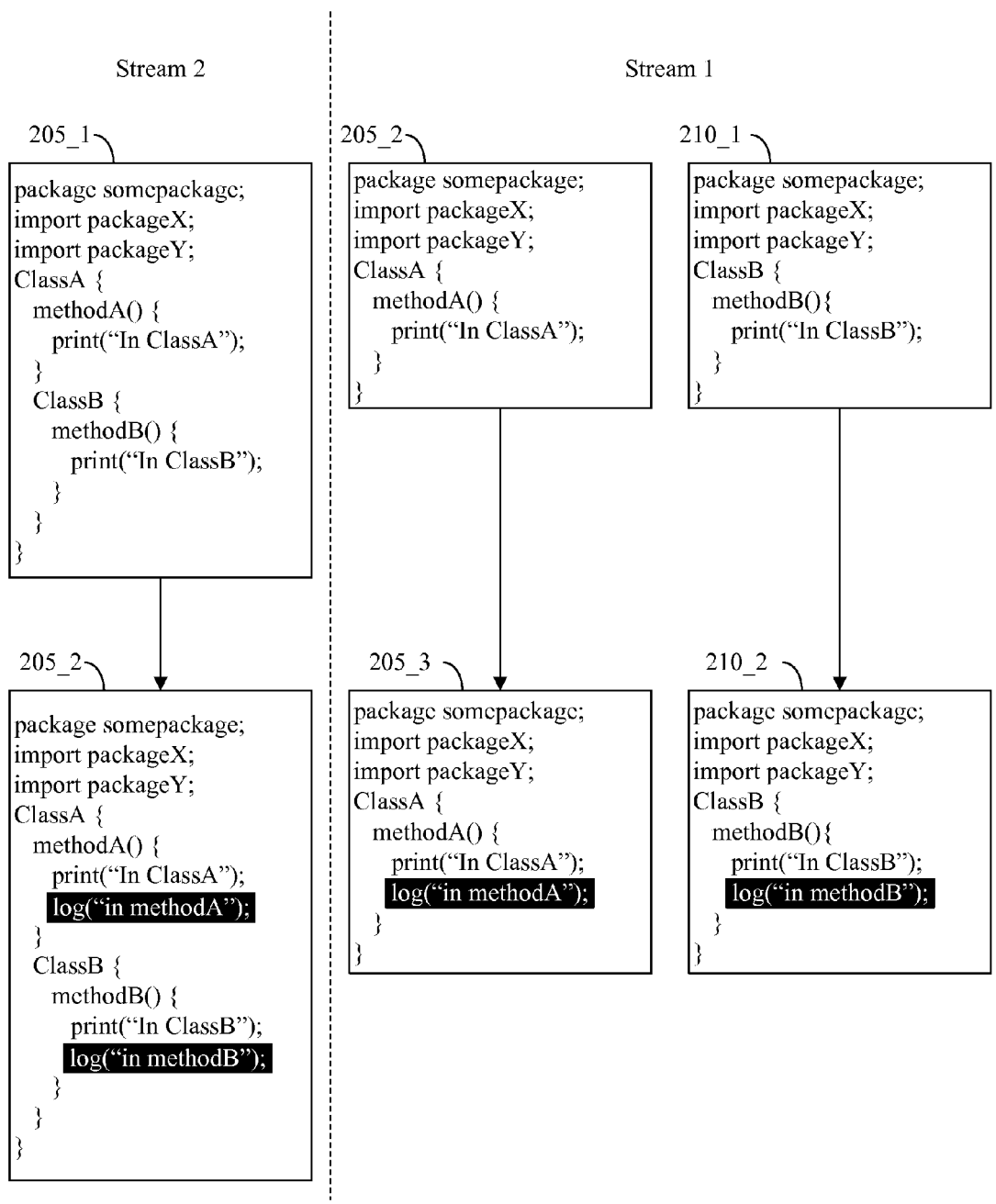
FIG. 6 is a block diagram illustrating an example of an SCM operation in accordance with another embodiment disclosed within this specification.

FIG. 6 is a block diagram illustrating an example of an SCM operation in accordance with another embodiment disclosed within this specification. FIG. 6 illustrates an example in which the changes implemented within artifact 205_2-stream2 fall within the bounds of the range specified in split-link annotation 215, e.g., within ClassB, and also outside of the bounds, e.g., within ClassA. Again, the changes implemented within artifact 205_2-stream2 are to be implemented within stream 1.

The SCM system can determine the changes between artifact 205_1-stream2 and artifact 205_2-stream2. The SCM system can search for, and locate, split-link annotation 215 that specifies the correct pre-split element, e.g., artifact 205_1-stream1. The SCM system further can determine whether the changes implemented in artifact 205_2-stream2 are within the range, e.g., at a location or position within the bounds specified, in split-link annotation 215.

In this example, one of the changes made to artifact 205_2-stream2 has been made to ClassA, e.g., outside of the range specified in split-link annotation 215, and a second change to ClassB, e.g., inside the range specified in split-link annotation 215. As shown, the changes in artifact 205_2-stream2 are within both ClassA and ClassB. As such, the SCM system implements the change to ClassA within artifact 205_2-stream1 resulting in artifact 205_3-stream1. The SCM system implements the change to ClassB within artifact 210_1-stream1 resulting in artifact 210_2-stream1.

Figure 7:
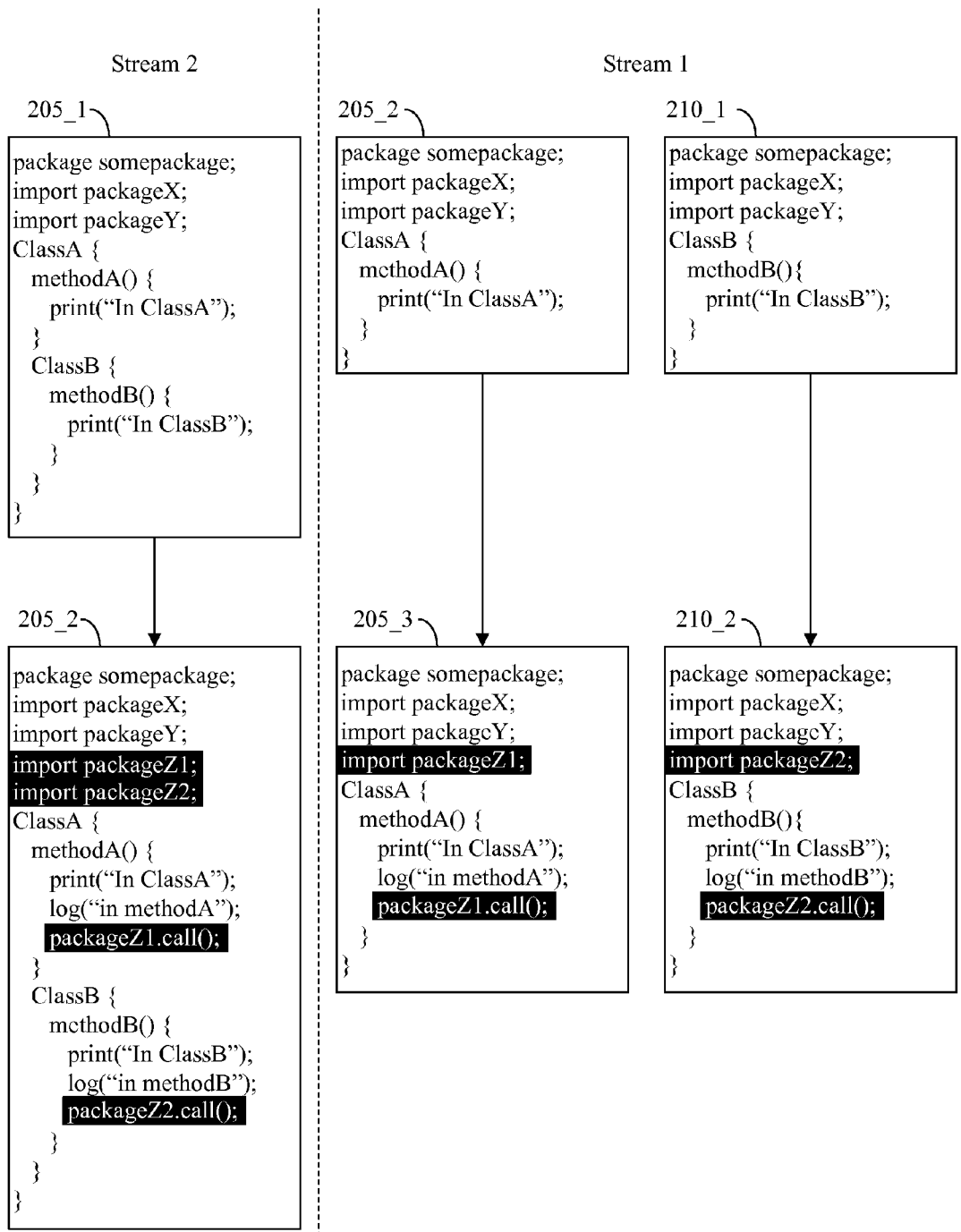
FIG. 7 is a block diagram illustrating an example of an SCM operation in accordance with another embodiment disclosed within this specification.

FIG. 7 is a block diagram illustrating an example of an SCM operation in accordance with another embodiment disclosed within this specification. FIG. 7 illustrates an example in which the change implemented within artifact 205_2-stream2 occurs before, e.g., outside, the range specified by split-link annotation 215. The changes implemented within artifact 205_2-stream2 are to be implemented within stream 1.

In one aspect, the SCM system can adjust the scope of the change or rely on a semantic analysis to determine that there is a change that needs to be incorporated into artifact 205_2-stream1 and a change that needs to be incorporated into artifact 210_1-stream1. Examples of changes in accordance with those illustrated in FIG. 7 can include the introduction of one or more new pre-processor directives or one or more global variables that do not belong to any class but are valid changes to the artifact as a whole. In such cases, some of the changes may need to be applied entirely to both artifact 205_2-stream1 and to artifact 210_1-stream1, while other changes may need to be applied to artifact 205_2-stream1 or to artifact 210_1-stream1.

The SCM system can determine the change(s) between artifact 205_1-stream2 and artifact 205_2-stream2. The SCM system can search for, and locate, split-link annotation 215 that specifies the correct pre-split element, e.g., artifact 205_1-stream1. The SCM system further can determine whether the change implemented in artifact 205_2-stream2 is within the scope of the change, e.g., within the range specified, in split-link annotation 215.

In this example, one of the changes made to artifact 205_2-stream2 is determined, for example, through semantic analysis, to relate to ClassA. The line of code "import packageZ1," for example, can be determined to relate to ClassA since ClassA includes a line of code that references "packageZ1." The change relating to ClassA, therefore, can be considered outside of the range specified in split-link annotation 215. Another one of the changes is determined, e.g., through semantic analysis, to relate to ClassB. The line of code "import packageZ2," for example, can be determined to relate to ClassB since ClassB includes a line of code that references "packageZ2." The change relating to ClassB, therefore, can be considered to be within the range specified in split-link annotation 215. Accordingly, the changes are determined to relate to both ClassA and to ClassB. As such, the SCM system can implement the change relating to ClassA within artifact 205_2-stream1 resulting in artifact 205_3-stream1. The SCM system can implement the change relating to ClassB within artifact 210_1-stream1 resulting in artifact 210_2-stream1.

Figure 8:
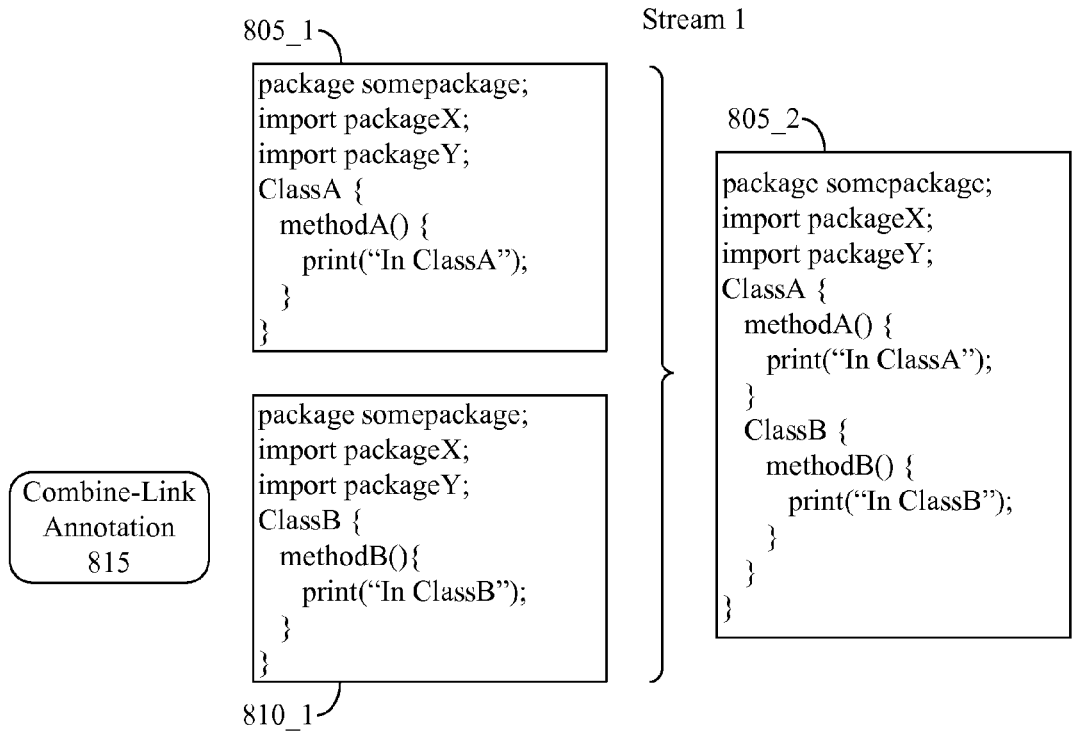
FIG. 8 is a block diagram illustrating an example of a combine type of SCM operation in accordance with another embodiment disclosed within this specification.

FIG. 8 is a block diagram illustrating an example of a combine type of SCM operation in accordance with another embodiment disclosed within this specification. The combine operation can be performed by the SCM system described herein. In general, FIG. 8 can follow the same conventions described with reference to FIG. 2. For example, artifact 805 can be named "ClassA.xxx". Artifact 810 can be named ClassB.xxx. In general, a combine type of SCM operation can move one artifact into another artifact. In this example, the SCM system can move ClassB into ClassA as an inner class. The SCM system can move each section, e.g., all content, of artifact 810_1 into artifact 805_1, thereby creating artifact 805_2. Artifact 805_2 can retain the name ClassA.xxx. In this example, artifact 810_1 can be said to be the "contributing element" and artifact 805_2 can be said to be the "receiving element".

In performing the combine operation, the SCM system can generate a combine-link annotation 815 that is associated with both artifact 810 and artifact 805. Combine-link annotation 815 can include an identifier indicating that the annotation is of the "combine" type. Combine-link annotation 815 can indicate, in general, that artifact 810_1, or the content thereof, has been incorporated into another artifact, in this case artifact 805_2. For example, combine-link annotation 815 can specify information such as the contributing element, inclusive of the version and/or stream of the contributing element, and a list of one or more contributed ranges. Each range can describe the scope or content of the contribution, e.g., section, from the contributing element that is provided to the receiving element. For example, each range can be specified in the form of a starting byte address and line number of the contributed content and an ending byte address and line number of the contributed content, e.g., of ClassB in this case, with regard to the contributing element. Thus, the ranges specify ranges within artifact 810_1 that are contributed to artifact 805_2 within the same stream.

Combine-link annotation 815 also can specify the receiving element, e.g., the name and version updated by the operation. Combine-link annotation 815 further can specify information such as the date and/or time that the combine operation is performed and the user that requested implementation of the combine operation. As illustrated in FIG. 8, the ability to include more than one range within combine-link annotation 815 allows for sections of the contributing element to be ignored in the merge operation.

Figure 9:
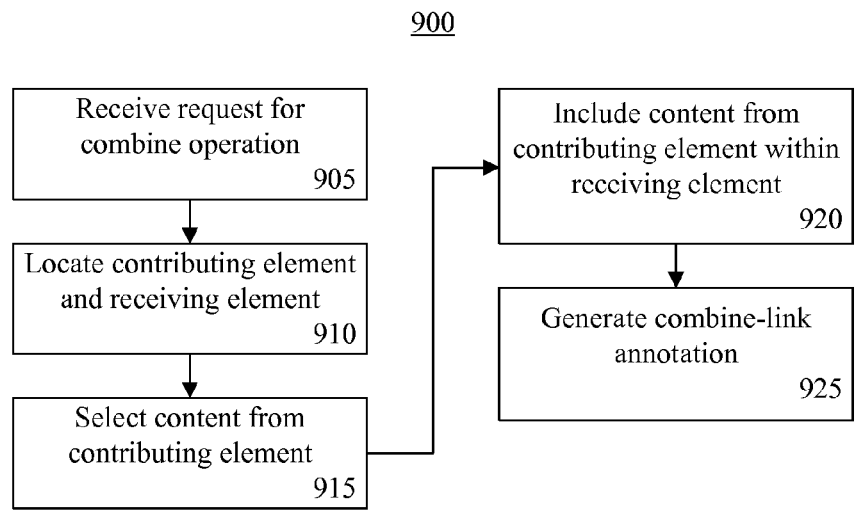
FIG. 9 is a flow chart illustrating a method of performing a combine type of SCM operation in accordance with another embodiment disclosed within this specification.

FIG. 9 is a flow chart illustrating a method 900 of performing a combine type of SCM operation in accordance with another embodiment disclosed within this specification. Method 900 can be performed by the SCM as described herein. In step 905, the SCM system can receive a request for a combine operation. The request can specify the contributing element, e.g., the component, and the receiving element, e.g., component. In step 910, the SCM system can locate or identity the contributing element and the receiving element. In step 915, the SCM system can select the content that is to be contributed to the receiving element from the contributing element. In step 920, the SCM system can include the content from the contributing element in the receiving element. In step 925, the SCM system can generate the combine-link annotation.

Figure 10:
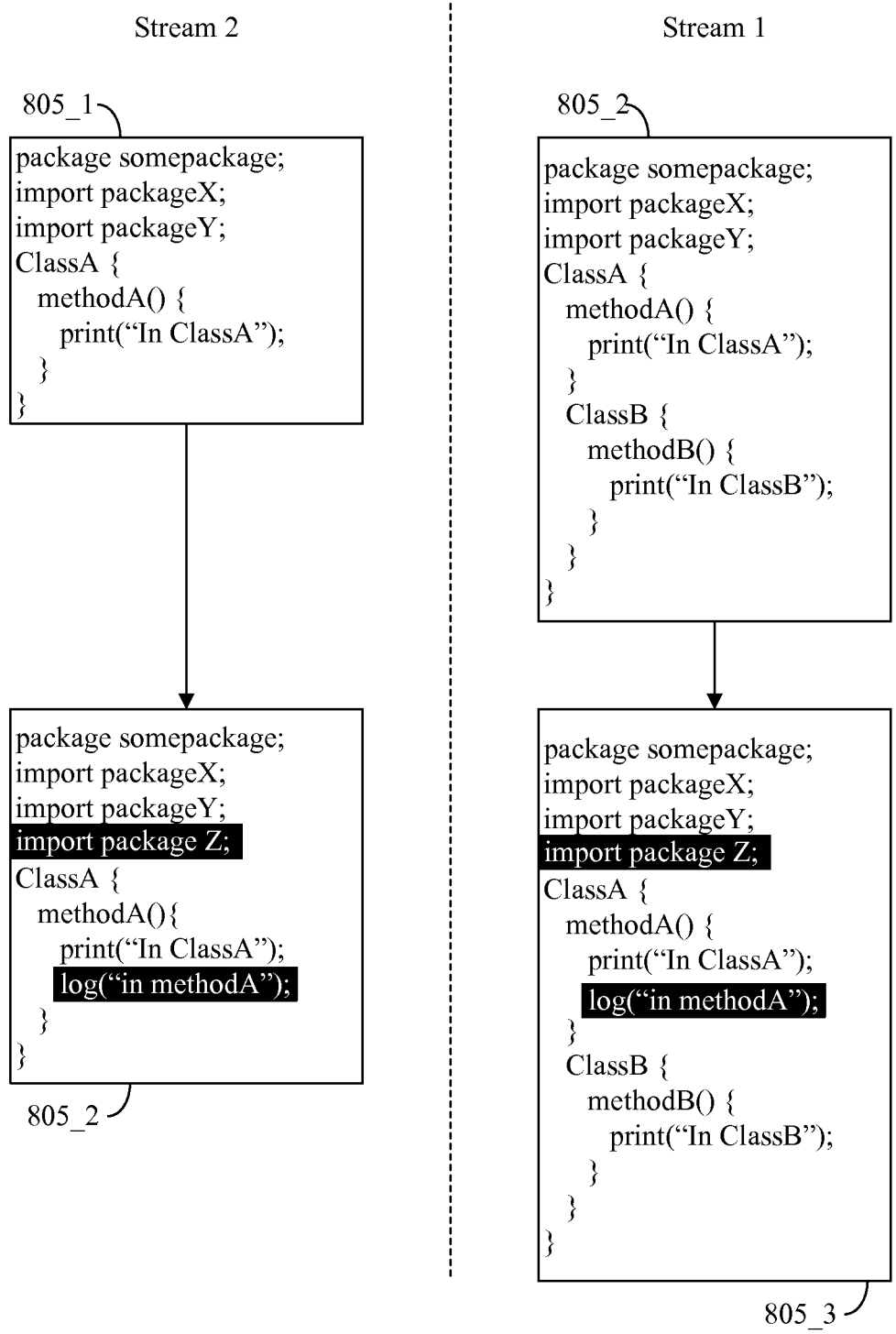
FIG. 10 is a block diagram illustrating an example of an SCM operation in accordance with another embodiment disclosed within this specification.
Figure 11:
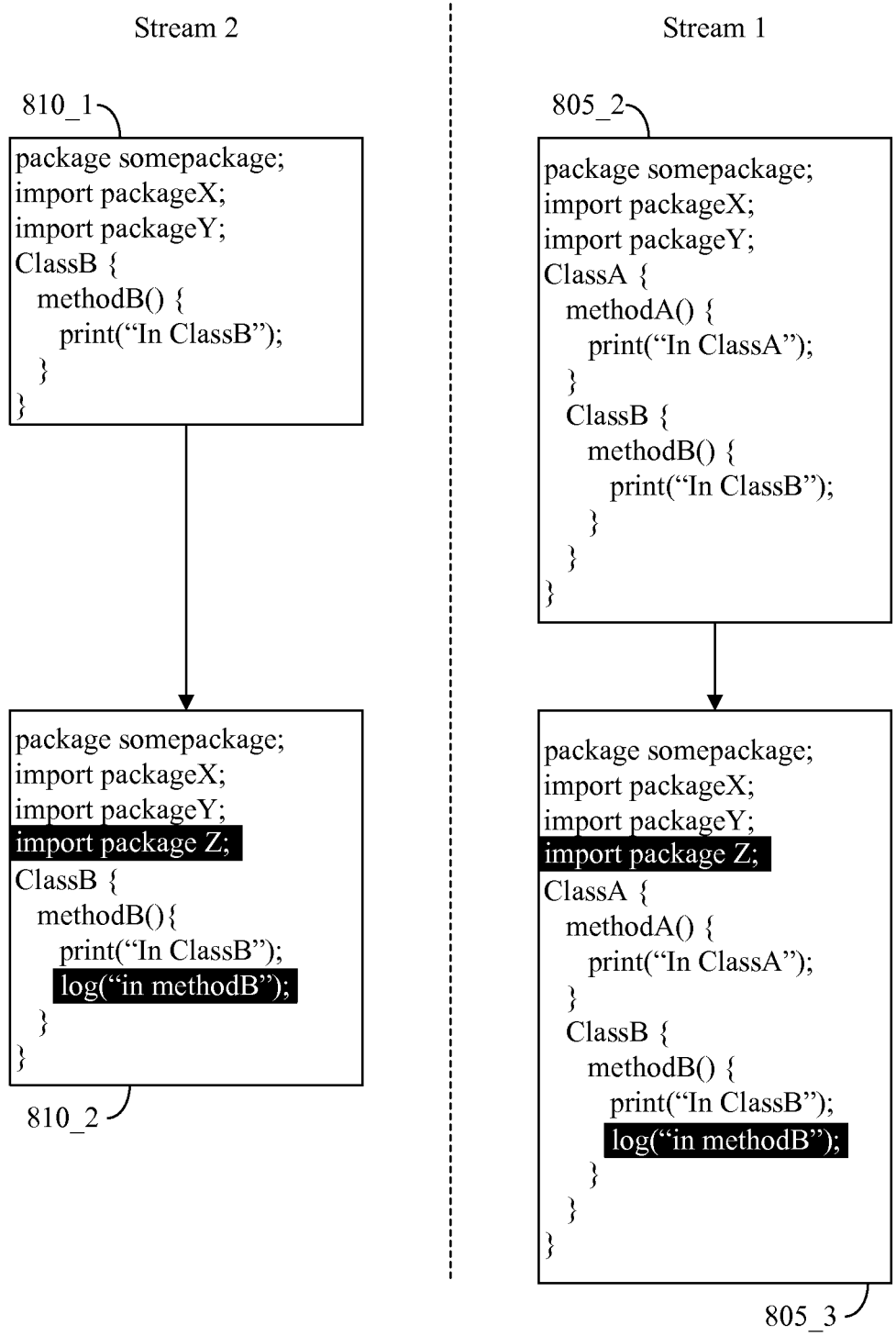
FIG. 11 is a block diagram illustrating an example of an SCM operation in accordance with another embodiment disclosed within this specification.

FIGS. 10-11 illustrate further examples of operations that can be performed by the SCM system relating to combine operations. FIG. 10 is a block diagram illustrating an example of an SCM operation in accordance with another embodiment disclosed within this specification. For purposes of illustration, consider the case in which a combine operation as described with reference to FIG. 8 is performed in stream 1 on artifact 805_1, resulting in artifact 805_2. Within stream 2, artifact 805_1 is modified thereby resulting in artifact 805_2-stream2, which includes the change. A user can request a merge operation in which the change to artifact 805_2-stream2 is to be implemented or applied to stream 1.

Within artifact 805_2-stream2, a first change is specific to ClassA and a second change is not class-specific. The SCM system can determine the differences between artifact 805_1-stream2 and artifact 805_2-stream2. Accordingly, the SCM system can search for, and locate, combine-link annotation 815. In general, using the combine-link annotation 815, the SCM system can determine whether the target stream, e.g., stream 1 in this case, includes the receiving element.

When the changes implemented in artifact 805_2-stream2 are in any of the contributed ranges specified in combine-link annotation 815, the SCM system can merge the changes into a new, e.g., a checked-out, version of the receiving element. In another example, when the differences are not in the range defined by the combine-link annotation, the SCM system can perform a semantic analysis of the differences and determine whether the change should be merged into the receiving element.

In this example, the SCM system can perform a merge in which the changes to artifact 805_2-stream 2 are applied to artifact 805_2-stream 1. Accordingly, the SCM system can implement both changes to artifact 805_2-stream1 resulting in artifact 805_3-stream1. For example, the SCM system can apply the changes to the most up-to-date version of artifact 805 in stream 1, e.g., artifact 805_2-stream1, resulting in artifact 805_3-stream1.

FIG. 11 is a block diagram illustrating an example of an SCM operation in accordance with another embodiment disclosed within this specification. For purposes of illustration, consider the case in which a combine operation has been performed involving artifact 805 and artifact 810 in stream 1 as described with reference to FIG. 8. Within stream 2, artifact 810 continues to exist and, further, has been modified as shown resulting in artifact 810_2-stream2. The changes implemented in artifact 810_2-stream2 are to be carried forward to stream 1.

Within artifact 810_2-stream2, a first change is specific to ClassB and a second change is not class specific. The SCM system can determine the change between artifact 810_1-stream2 and artifact 810_2-stream2. The SCM system further can search for, and locate, combine-link annotation 815. The SCM system determines that stream 1 no longer includes artifact 810, per combine-link annotation 815. The SCM system can determine that any changes to artifact 810_2-stream2 are to be implemented within artifact 805_2-stream1 according to combine-link annotation 815. Accordingly, the changes to artifact 810_2-stream2 are applied to artifact 805_2-stream1 resulting in artifact 805_3-stream1. As illustrated, the changes can be implemented within artifact 805_3-stream 1 and are implemented at the appropriate locations, e.g., within ClassB and outside of ClassB.

Figure 12:
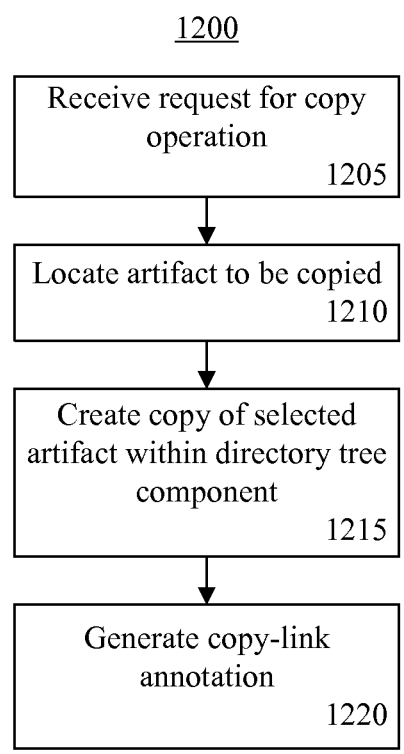
FIG. 12 is a flow chart illustrating a method of performing a copy type of SCM operation in accordance with another embodiment disclosed within this specification.

FIG. 12 is a flow chart illustrating a method 1200 of performing a copy type of SCM operation in accordance with another embodiment disclosed within this specification. Method 1200 can be performed by the SCM system as described herein. In step 1205, a request for a copy operation can be received by the SCM system. The request can specify the particular artifact that is to be copied. For example, the request can specify a particular artifact within a first directory tree component and a second and different directory tree component as a target.

A "directory tree component" can refer to a snapshot of a hierarchical directory for a particular software system being developed. As such, the directory tree component can specify directory structures, e.g., hierarchies, and the particular artifact or artifacts included within each directory tree component, inclusive of the location of the artifact or artifacts within the hierarchy specified.

In step 1210, the SCM system can locate or select the artifact that is to be copied. In step 1215, the SCM can create a copy of the selected artifact within the second directory tree component. The second directory tree component can be in the same stream as the first directory tree component. In step 1220, the SCM system can generate a copy-link annotation associated with the artifact that is copied.

The copy-link annotation can indicate the directory tree component from which the artifact is being copied, the directory tree component to which the artifact is being copied, the artifact, inclusive of the version, being copied, and the particular artifact (inclusive of version) that is created with the second directory tree component. For example, the path within the second directory tree component of the newly created element, e.g., the copied element, can be specified.

Figure 13:
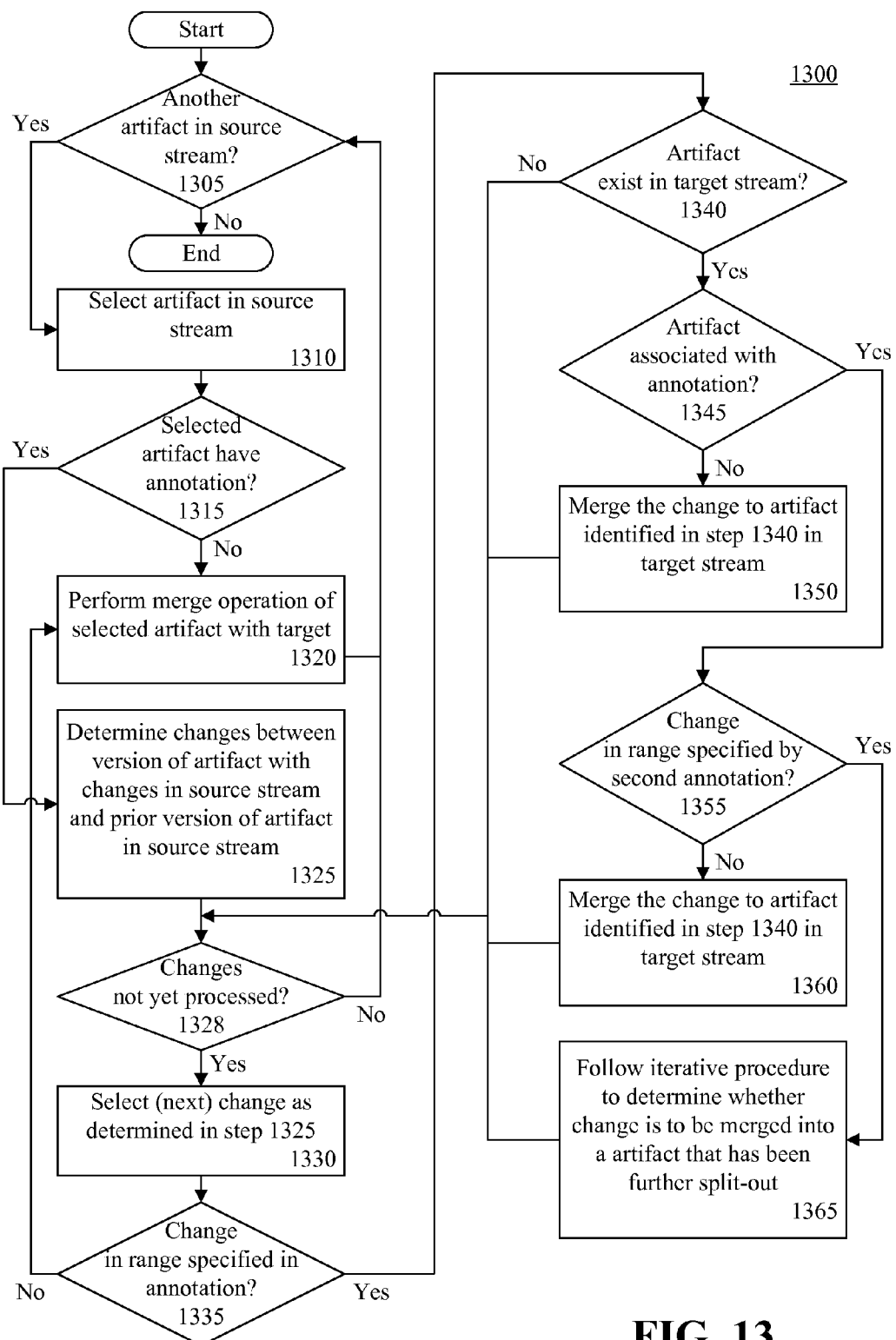
FIG. 13 is a flow chart illustrating a method of performing SCM operations in accordance with another embodiment disclosed within this specification.

FIG. 13 is a flow chart illustrating a method 1300 of performing SCM operations in accordance with another embodiment disclosed within this specification. Method 1300 can be implemented by the SCM system described within this specification with reference to FIGS. 1-12. Method 1300 provides an example of a technique for implementing merge type functions that operate across logical boundaries such as streams. Method 1300 further accommodates a chain, e.g., a plurality, of split-out and/or combine types of SCM operations that may have been performed in one or more streams.

Method 1300 can begin in a state in which a request to merge streams within the SCM system has been received. The request, for example, can specify that a merger of a second stream, e.g., a source stream, with a first stream, e.g., a target stream, is to be performed. The method illustrated in FIG. 13 can be performed across, or for each artifact that is located within the source stream.

Method 1300 can start and, in step 1305, the SCM system can determine whether there are any artifacts in the source stream that have not yet been processed. When one or more artifacts remain to be processed, method 1300 can proceed to step 1310. When no further artifacts in the source stream remain to be processed, method 1300 can end. In step 1310, an artifact within the source stream that has not yet been processed can be selected.

In step 1315, the SCM system can determine whether the selected artifact has, or is associated with, an annotation. As noted, although an annotation can specify particular artifact versions included or involved in a given SCM operation, the annotation itself can be associated with an artifact or artifacts in general. As such, the SCM can search for an annotation relating to a particular artifact such as the selected artifact. When the SCM system determines that the selected artifact is associated with an annotation, method 1300 can proceed to step 1325. The annotation can be a split-link annotation or a combine-link type of annotation. When the SCM system determines that the selected artifact is not associated with an annotation, method 1300 can proceed to step 1320.

In step 1320, the SCM system can perform a merge operation on the selected artifact in which the selected artifact in the source stream is merged with a corresponding artifact, e.g., a same named artifact, within the target stream. After step 1320, method 1300 can loop back to step 1305 to continue processing another artifact in the source stream.

In step 1325, the SCM system can determine one or more changes between the version of the selected artifact in the source stream that includes the changes to be propagated to the target stream and a prior version of the artifact in the source stream. In step 1328, the SCM system can determine whether there are any changes that have not yet been processed. When there are changes that have not yet been processed, method 1300 can continue to step 1330. When no further changes remain, method 1300 can loop back to step 1305 to continue processing. In step 1330, the SCM system can select a change identified in step 1325. It should be appreciated that during subsequent iterations through step 1330, a "next" change can be selected.

In step 1335, the SCM system can determine whether the selected change is within the range specified within the annotation. As noted, a comparison of the location and/or position of the change can be performed with respect to the range specified within the annotation. The location of the change in the version of the artifact within the source stream can be compared with the range specified in the annotation. When the selected change is not within the range specified within the annotation, method 1300 can loop back to step 1320 and continue processing as described. In the case of a split-link annotation, for example, the SCM determines that the change is not within a newly generated artifact within the target stream, but rather within a like named artifact within the target stream as described herein. When the selected change is within the range specified within the annotation, method 1300 can continue to step 1340.

In step 1340, the SCM can determine whether the artifact specified within the annotation exists within the target stream. In the case of a split-link annotation, the SCM system can determine whether the post-split element exists in the target stream. In the case of a combine-link annotation, the SCM system can determine whether the receiving element exists within the target stream. When the artifact specified within the annotation exists within the target stream, method 1300 can proceed to step 1345. Otherwise, the selected change is not applied and method 1300 can loop back to step 1328 to continue processing further changes.

In step 1345, the SCM system can determine whether the artifact located within the target stream is associated with an annotation. When the artifact within the target stream is also associated with an annotation, e.g., a second and further annotation, method 1300 can proceed to step 1355. Otherwise, method 1300 can continue to step 1350. In step 1350, the SCM system can perform a merge of the change from the source stream to the element identified in step 1340 within the target stream. After step 1350, method 1300 can loop back to step 1328 to continue processing further changes.

Continuing with step 1355, the SCM system can determine whether the selected change is in the range specified in the second annotation. When the change is not in the range specified by the second annotation, method 1300 can proceed to step 1360, where the change can be merged with the component identified in step 1340 in the target stream. Otherwise, method 1300 can proceed to step 1365, where the SCM system can continue to determine whether any component specified by the second annotation (e.g., a further receiving element or a further post-split element) is associated with a further, e.g., a third, annotation.

It should be appreciated that the SCM system can continue in this manner, iteratively, until the further annotations are exhausted and/or resolved as described with reference to steps 1350 and/or 1360, e.g., until the last artifact determined within located annotations is not associated with a further annotation. Once this iterative procedure is complete or otherwise resolves, method 1300 can loop back to step 1328 to continue processing.

The one or more embodiments described within this specification are illustrated in the context of an SCM. In another aspect, the one or more embodiments can be utilized in any of a variety of different text management systems in which one version of a textual work is composed of multiple files, e.g., artifacts. For example, one or more embodiments can be applied or utilized within a document management system for development and/or tracking of different versions of literary works.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For purposes of explanation, specific nomenclature is set forth to provide a thorough understanding of the various inventive concepts disclosed herein. However, the terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method of software configuration management, the method comprising:
   removing a selected section from a first artifact in a first stream, wherein the first artifact comprises a plurality of sections;
   creating a second artifact including the selected section and not including at least one other section of the plurality of sections in the first stream;
   using a processor, generating an annotation specifying the first artifact, a range within the first artifact corresponding to the selected section, and the second artifact into which the selected section is moved;
   applying a change made in the first artifact located in a second stream to the second artifact in the first stream;
   determining a change between a first version of the first artifact and a second version of the first artifact in the second stream;
   detecting the annotation associated with the first artifact; and
   determining whether the change between the first version of the first artifact and the second version of the first artifact in the second stream is within the range specified in the annotation associated with the first artifact.

2. The method of claim 1, wherein determining whether the change between the first version of the first artifact and the second version of the first artifact in the second stream is within the range specified in the annotation associated with the first artifact comprises:
   comparing a location of the change implemented in the second version of the first artifact in the second stream with the range specified in the annotation associated with the first artifact.

3. The method of claim 2, further comprising:
   responsive to determining that the change between the first version of the first artifact and the second version of the first artifact in the second stream is within the range specified in the annotation associated with the first artifact:
   locating the second artifact specified by the annotation associated with the first artifact within the first stream; and
   implementing the change at a location within the second artifact in the first stream corresponding to the location of the change implemented in the second version of the first artifact in the second stream.

4. The method of claim 1, further comprising:
   responsive to determining that the change between the first version of the first artifact and the second version of the first artifact in the second stream is not within the range specified in the annotation associated with the first artifact, implementing the change within the first artifact in the first stream.

5. The method of claim 1, wherein the annotation associated with the first artifact specifies a version of the first artifact from which the selected section is removed.

6. The method of claim 1, wherein the annotation associated with the first artifact specifies a starting location of the range within the first artifact from which the selected section is removed and an ending location of the range within the first artifact from which the selected section is removed.

7. The method of claim 1, wherein the annotation associated with the first artifact specifies the second artifact into which the selected section is moved and event information corresponding to a split-out event initiating removal of the selected section.

8. A method of software configuration management, the method comprising:
   selecting a first artifact in a first stream;
   including content of the first artifact within a second artifact in the first stream;
   using a processor, generating an annotation indicating that the first artifact no longer exists in the first stream and that the second artifact includes the content of the first artifact;
   determining a change between a first version of the first artifact and a second version of the first artifact in a second stream;
   detecting the annotation associated with the first artifact;
   determining that the first artifact does not exist in the first stream according to the annotation associated with the first artifact;
   selecting the second artifact in the first stream according to the annotation associated with the first artifact; and
   implementing the change in the second artifact in the first stream.

9. The method of claim 8, wherein implementing the change in the second artifact in the first stream further comprises:
   making the change to content of the second artifact in the first stream that was included from the first artifact.

10. The method of claim 8, wherein the annotation associated with the first artifact specifies a starting location and an ending location defining a range within the content of the first artifact that is included in the second artifact.

\* \* \* \* \*